United States Patent [19]

Sinclair et al.

[11] 4,364,639
[45] Dec. 21, 1982

[54] VARIABLE ATTENUATION ELECTRO-OPTIC DEVICE

[75] Inventors: William J. Sinclair, Nepean; Josef Straus; Philip M. Garel-Jones, both of Ottawa, all of Canada

[73] Assignee: Northern Telecom Limited, Montreal, Canada

[21] Appl. No.: 181,173

[22] Filed: Aug. 25, 1980

[51] Int. Cl.³ .................................. G02F 1/13
[52] U.S. Cl. .......................... 350/331 R; 350/96.15; 350/338; 350/413; 350/448
[58] Field of Search ............. 350/96.14, 96.17, 331 R, 350/347 V, 347 E, 17, 448, 450, 96.15, 96.18, 96.19, 330, 332, 338, 384, 403, 413, 446; 333/81 R; 332/17

[56] References Cited

U.S. PATENT DOCUMENTS

| 3,784,280 | 1/1974 | Bigelow | 350/347 E |
| 3,881,806 | 5/1975 | Suzuki | 350/350 R |
| 3,882,039 | 5/1975 | Sprokel | 350/350 R |
| 3,972,589 | 8/1976 | Shelly et al. | 350/350 R |
| 4,208,094 | 6/1980 | Tomlinson et al. | 350/96.19 X |

FOREIGN PATENT DOCUMENTS 1396828  6/1975  United Kingdom ............ 350/347 E

Primary Examiner—John K. Corbin
Assistant Examiner—David Lewis
Attorney, Agent, or Firm—Stuart L. Wilkinson

[57] ABSTRACT

A variable attenuation electro-optic device has a lens for collimating light from an input fiber and for focussing light into an output fiber. The optical path of light passing through the device passes through a dynamic scattering liquid crystal cell whose optical transmissivity can be varied by varying an AC electric field applied across it. Reflective and transmissive embodiments are described using one or two lenses of the Selfoc ® type. The applied AC introduces a frequency component into the attenuation which is suppressed to particularly adapt the device for use as an attenuator or enhanced and modulated to particularly adapt the device for use as a modulator.

8 Claims, 7 Drawing Figures

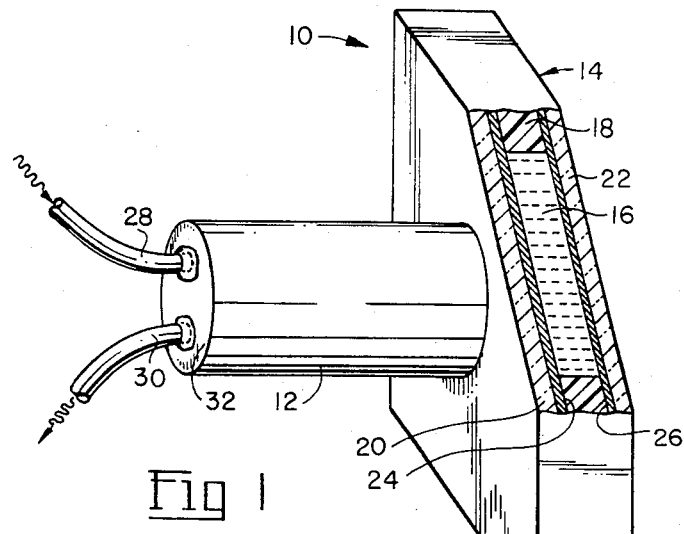
Fig 1
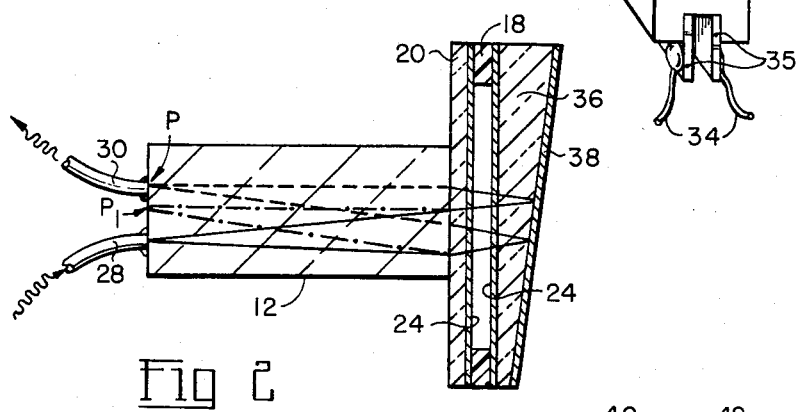
Fig 2
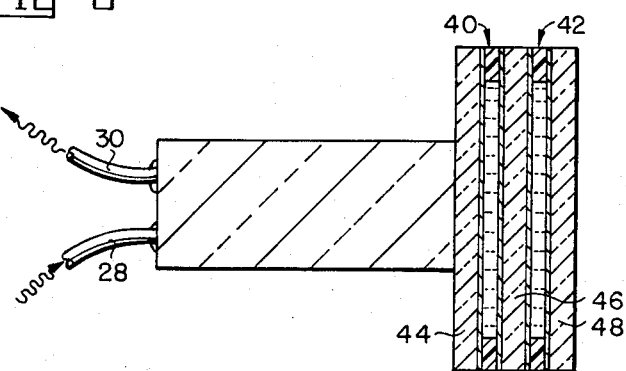
Fig 3
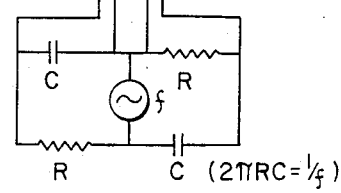

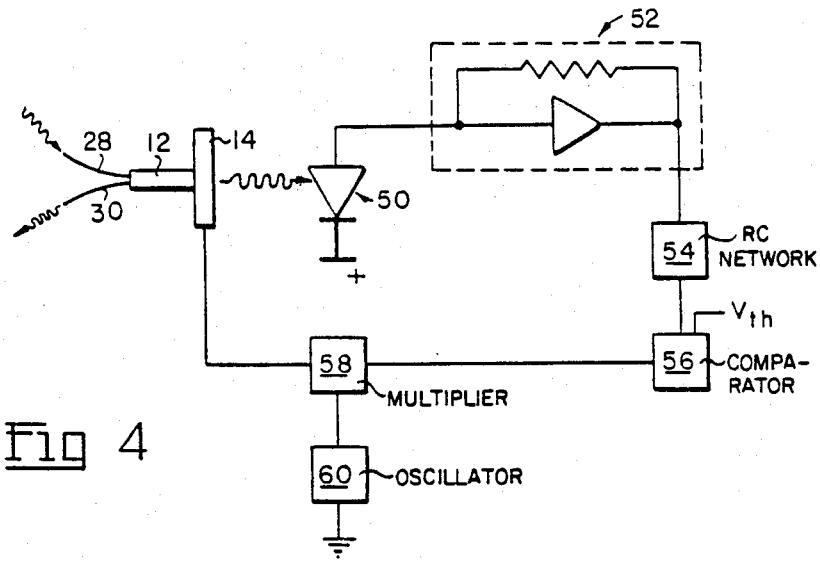
Fig 4
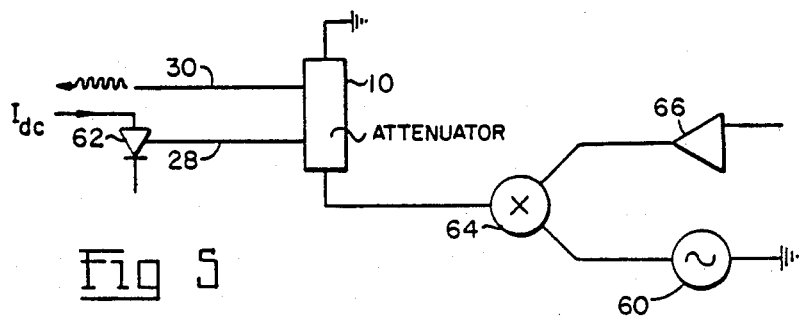
Fig 5
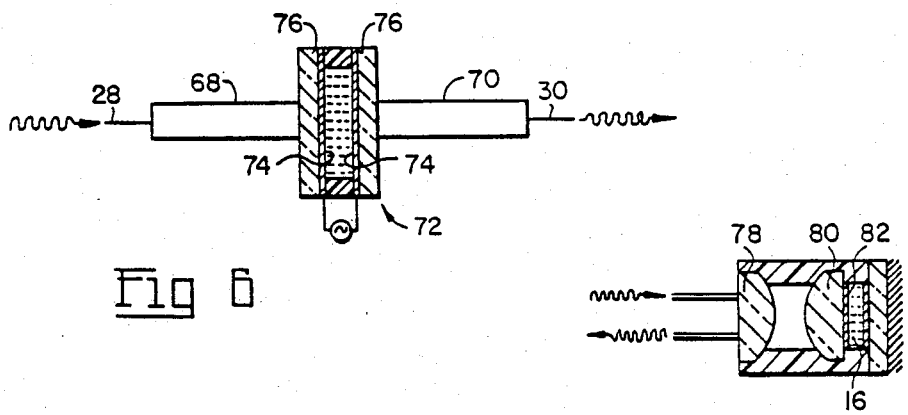
Fig 6
Fig 7

VARIABLE ATTENUATION ELECTRO-OPTIC DEVICE

This invention relates to variable attenuation electro-optic devices for use in fiber optic communication systems.

There is a clear advantage, especially for digital systems in standarizing optical signal levels since optical receivers, i.e. avalanche or PIN photodiodes and associated electronics can then also be standarized. However, losses in a fiber optic path can vary according to path length, fiber quality, and the number and integrity of connectors and splices. Consequently, the level of received optical signal corresponding to a uniform emitted level will also vary. One way of equalizing the level of input optical signals is by selective attenuation.

Attenuators for fiber optic systems have been proposed in which a partially transmissive solid metallic or dielectric film is sandwiched between contiguous fiber ends. Such a structure is useful if the input signal level can be accurately predicted and if that level does not undergo long term fluctuation. The required attenuation can then be built in under factory conditions. This is hardly of practical value however since the true signal level can only be known when the installed system is tested. Furthermore, long term fluctuations do occur, for example, as a consequence of temperature change or reduced performance of other system components. For this purpose a variable attenuator is required.

According to one aspect of the invention an electro-optic device comprises a collimating lens for collimating light at a liquid crystal cell, the cell having a liquid crystal film flanked by conducting films for applying a potential difference across the liquid crystal to selectively alter optical transmissivity thereof, the device having a reflector on a side of the liquid crystal film remote from the collimating lens for reflecting light propagating through the device back through the collimating lens. Preferably the collimating lens is a Selfoc ® lens which adheres to, or is formed integrally with, a transparent plate forming one confining plate of the liquid crystal cell.

Input and output fibers have their ends coupled to the other end of the collimating lens, the fiber ends being symmetrically disposed on opposite sides of the central longitudinal axis of the lens.

In order to suppress the influence on attenuation level of unwanted reflections, a rear confining plate of the cell on which the reflector is formed can be wedge-shaped. As a consequence, reflective rays which have passed through the liquid crystal material are focussed at one position at the end of the collimating lens while reflected rays which have not are focussed predominantly at a different position. The output fiber is then fixed to the output collimating lens so that its end coincides with the first position.

In an alternative embodiment of the invention the electro-optic device has a liquid crystal cell of a transmissive type, the device having a collimating lens on one side of the liquid crystal cell for collimating input light and a focussing lens on the other side of the liquid crystal cell for focussing output light.

To particularly adapt the electro-optic device for use as an attenuator, the liquid crystal film used in the cell can be divided into two regions with an AC voltage applied across one of the regions 90° out of phase to that AC voltage applied across the other region. In use, the optical path of light directed into the cell from the collimating lens traverses both of the regions thus introducing frequency components which are not in phase and so reducing the tendency for the output light to be modulated at the frequency of the impressed AC voltage.

Although such an AC frequency component is undesirable in attenuators, the component can instead be enhanced and modulated to particularly adapt the electro-optic device for use as a modulator.

The liquid crystal cell is preferably of the dynamic scattering type.

Embodiments of the invention will now be described by way of example with reference to the accompanying drawings, in which:

FIG. 1 is a perspective view, partly in section of an electro-optic attenuator;

FIG. 2 shows in longitudinal section an attenuator similar to that of FIG. 1 but incorporating a modification to prevent stray reflections from adversely affecting attenuation;

FIG. 3 shows in longitudinal section an attenuator similar to that of FIG. 1 but incorporating a modification to suppress modulation of attenuator output by an AC drive to the device;

FIG. 4 shows in schematic form a feedback circuit for setting a fixed level of output optical signal;

FIG. 5 shows in schematic form a modulation circuit for varying attenuation of the device as a function of an impressed signal;

FIG. 6 is a schematic view of another form of attenuator; and

FIG. 7 shows yet another form of optical attenuator.

Referring in detail to the drawings, an attenuator 10 illustrated in FIG. 1 has a lens 12 of the Selfoc ® radially varying refractive index type. The lens 12 has a pitch length of n/4 where n is an odd integer and functions to collimate input light and to focus output light as will be appreciated presently. One end of the lens 12 adheres, through the agency of a transparent epoxy, to a liquid crystal (LC) cell 14. The cell 14 has a 12 micron film 16 of LC material obtainable from Ashley Butler Inc., under specification no. TU25, the LC being retained within a spacer sandwiched between 2 mm thick glass plates 20 and 22. On an inside surface of the plate 20 is vacuum deposit a 0.14 micron layer of indium tin oxide 24 constituting a transparent conductor. On an inside surface of the plate 22 is a 0.15 micron layer 26 of gold constituting a reflecting conductor. The liquid crystal material is MBBA/EBBA mixture doped to give a dynamic scattering LC.

Input and output optical fibers 28 and 30 have their ends symmetrically disposed about the central longitudinal axis of the Selfoc lens 10, the fiber ends being secured to one end 32 of the lens by an index matching epoxy.

On application of an AC electrical field across the dynamic scattering LC layer 16 via conductive layers 24 and 26, groups of LC molecules are stimulated to undergo a circulatory movement causing incident light to be scattered to an extent depending on the applied AC voltage. After transmission back and forth through the liquid crystal cell, the light is directed into the output fiber 30. Since the combination of output fiber 30 and lens 12 is designed to accept a predetermined cone of light rays, introducing scattering removes light from that acceptance cone and so reduces light launched into the output fiber. Typically, the LC cell is driven by an AC voltage of frequency 60 Hz and with a voltage of 0 to 30 V rms. AC drive is necessary since under DC conditions the LC would slowly deteriorate.

Leads 34 to the cell 14 are held by conductive epoxy to contact pads 35 formed on plates 20 and 22. When installed in a fiber optic system, the optical fibers 28 and 30 and the conducting leads 34 for providing electrical drive to the attenuator are layed up in a common cable (not shown). Associated with the attenuator is a feedback circuit which is shown in detail in FIG. 4.

The level of attenuation obtained when using the FIG. 1 attenuator is detrimentally influenced somewhat by reflection of light other than at the reflective coating 26. These reflections which derive from cement points between the Selfoc lens 12 and the liquid crystal cell 14 as well as from surfaces of the plate 20 are directed predominantly into the output fiber. Considering the embodiment of FIG. 2, a rear plate 36 is wedge-shaped and has a reflective gold coating 38 extending in a plane inclined to that of the optic axes of the device. In use, the primary reflective beam (broken line) and the predominant stray reflections (chain line) are focussed at points P and $P_1$ respectively at the end of the Selfoc lens 12. The end of the output fiber 30 is sited at the point P.

To maximize the lifetime of the LC cell 14, it must be driven by an AC voltage. Unfortunately, AC operation introduces a frequency component to the attenuated light output. AC frequency could be adjusted to a value outside the frequency band of interest but above 10 KHz scattering is no longer voltage dependent. Referring to FIG. 3, an arrangement is shown which negates the modulation affect of the AC drive. In contrast to the single LC cell of FIG. 1, two identical cells 40 and 42 are located in tandem and a drive voltage is applied simultaneously across one cell and, 90° out of phase, across the other cell. In this arrangement, front and central plates 44 and 46 respectively are both transparent and a reflective coating is applied to the inside or outside surface of a rear plate 48.

FIG. 4 illustrates a control circuit for the attenuators of FIGS. 1 and 3. Attenuated light from output fiber 30 is directed at a PIN photodiode detector 50. A transimpedance amplifier 52 uses shunt feedback to present a low impedance to the photodiode 50. High frequency noise and modulation is removed at RC network 54 and the resulting signal is fed to a high gain amplifier 56 for comparison with a threshold voltage $V_{th}$. The amplifier output controls a multiplier 58 which adjusts the amplitude of AC voltage applied to the LC cell 14 from oscillator 60.

If desired instead of suppresing the low frequency component, it can be enhanced by appropriate selection of cell thickness and LC type. The electro-optic device is then used as a modulator by impressing a modulating signal on the AC drive to the cell. A suitable modulation circuit is shown schematically in FIG. 5. The output of an injection laser or light emitting diode 62 is taken through an attenuator 10 of the type described previously and is then launched into an output fiber 30. Drive to the attenuator 10 is derived from a multiplier 64 at which the signals from oscillator 60 and a modulating signal from a driver circuit 66 are combined.

Since Selfoc lenses are expensive components, the preferred embodiment uses a single lens and a reflective coating within the LC cell. An alternative embodiment, shown in FIG. 6, uses two such Selfoc lens 68 and 70, the lenses having their optic axes aligned. The lenses are located on opposite sides of a liquid crystal cell 72 of a transmissive type in contrast with the LC cell of previous embodiments which were reflective in character.

The cell 72 has transparent indium tin oxide conductive coatings 74 on both boundary plates 76. Input and output fibers 28 and 30 are cemented to the lenses 68 and 70 at points aligned with their central axes. The input and output fibers from such a device extend in opposite directions and consequently do not have to be bent if the device is used in a "through" installation; this can produce a very compact installation.

In the previously described structures, the lens and LC cell are quite distinct but are fixed together by a transparent epoxy. Device integrity can be improved and mass production facilitated if the lens, or a rear component of the lens if it is a multi-component lens, is made integral with the front boundary plate of the LC cell. An embodiment is shown in FIG. 7 in which two plano-convex lens 78 and 80 collimate and focus the input and output light respectively. The lens 78 has a flat face facilitating attachment to the fibers and the rear lens 80 has a flat face bearing a transparent indium tin oxide coating 82 forming one of the opposed electrodes for applying electric field across the LC.

What is claimed is:

1. An electro-optic device comprising a graded refractive index lens for collimating input light at a liquid crystal cell and for focussing output light from the cell, the cell having a film of liquid crystal material flanked by first and second conducting films for applying an electric field across the liquid crystal to alter its optical transmissivity, and a reflector on a side thereof remote from the lens for reflecting input light propagating through the cell back through the lens.

2. An electro-optic device as claimed in claim 1, in which the liquid crystal cell incorporates first and second plates flanking the film of liquid crystal, one of said conducting films being located on a front one of said plates and being transparent, the other conducting film located on an inside surface of a rear one of the plates being reflecting, and one end of the lens being fixed to the front plate.

3. An electro-optic device as claimed in claim 2, further comprising an input optical fiber and an output optical fiber, said fibers each having one end adhering to the other end of the lens through the agency of an index matching adhesive.

4. An electro-optic device as claimed in claim 2, in which the rear plate is wedge-shaped, having an inside surface contacting the liquid crystal extending parallel to the front plate and a rear reflecting surface inclined to said inside surface.

5. An electro-optic device as claimed in claim 2, in which the lens and the front plate are integral with one another.

6. An electro-optic device as claimed in claim 1, in which first and second transparent plates flank the liquid crystal film, the plates functioning as substrates for the respective conducting films.

7. An electro-optic device as claimed in claim 1, the liquid crystal cell having a second film of liquid crytal material in tandem with the first film of liquid crystal material, the second film being flanked by third and fourth conducting films for applying an electric field across the second film of liquid crystal to alter its optical transmissivity, and means for applying an AC voltage across each of the films such that the AC voltage across the first film has a predetermined phase relationship to the AC voltage applied across the second film.

8. An electro-optic device as claimed in claim 1, the liquid crystal being a dynamic scattering liquid crystal.

* * * * *